United States Patent
Hirai

(10) Patent No.: US 10,247,588 B2
(45) Date of Patent: Apr. 2, 2019

(54) PIEZOELECTRIC KARMAN VORTEX FLOWMETER

(71) Applicant: SURPASS INDUSTRY CO., LTD, Saitama (JP)

(72) Inventor: Kazuki Hirai, Saitama (JP)

(73) Assignee: SURPASS INDUSTRY CO., LTD., Saitama (JP)

( * ) Notice: Subject to any disclaimer, the term of this patent is extended or adjusted under 35 U.S.C. 154(b) by 0 days.

(21) Appl. No.: 15/265,419

(22) Filed: Sep. 14, 2016

(65) Prior Publication Data

US 2017/0097250 A1 Apr. 6, 2017

(30) Foreign Application Priority Data

Oct. 2, 2015 (JP) .................. 2015-196748

(51) Int. Cl.
*G01F 1/32* (2006.01)
*G01F 15/00* (2006.01)

(52) U.S. Cl.
CPC .......... *G01F 1/3209* (2013.01); *G01F 1/3263* (2013.01); *G01F 15/006* (2013.01)

(58) Field of Classification Search
CPC ..... G01F 1/3209; G01F 1/3263; G01F 15/006
(Continued)

(56) References Cited

U.S. PATENT DOCUMENTS 4,526,040 A * 7/1985 Matsubara ............ G01F 1/3245
73/861.24

4,625,564 A * 12/1986 Murakami ............ G01F 1/3263
73/861.24

(Continued)

FOREIGN PATENT DOCUMENTS

JP 09-196722 7/1997
JP 10-142017 5/1998
(Continued)

OTHER PUBLICATIONS

Extended European Search Report for EP Appl. No. 16190634.2 dated Dec. 19, 2016.
(Continued)

*Primary Examiner* — Natalie Huls
*Assistant Examiner* — Monica S Young
(74) *Attorney, Agent, or Firm* — MH2 Technology Law Group, LLP

(57) ABSTRACT

There is provided a Karman vortex flowmeter including: a body inside which a flow passage and a Karman vortex generation column are formed; and a flow rate measurement unit that measures Karman vortexes generated by the Karman vortex generation column to thereby obtain a flow rate of a fluid, in which the flow rate measurement unit includes: a piezoelectric element; a piezoelectric element holder that is attached to the body so that the piezoelectric element is arranged in a flow passage; and a thin film part that is formed of a material with higher corrosion resistance than an electrode of the piezoelectric element, the piezoelectric element holder houses the piezoelectric element in a state where the piezoelectric element is sandwiched by a pair of plate-shaped parts integrally formed by a resin material, and in which the thin film part is arranged between the plate-shaped parts and the electrode.

9 Claims, 13 Drawing Sheets

(58) Field of Classification Search
USPC .................................................. 73/861, 240
See application file for complete search history.

(56) References Cited

U.S. PATENT DOCUMENTS

| | | | | |
|---|---|---|---|---|
| 4,976,153 | A | * | 12/1990 | Nagumo ............... G01F 1/3209 73/861.03 |
| 5,557,051 | A | | 9/1996 | Schalk et al. |
| 2004/0169249 | A1 | * | 9/2004 | Parsons ................... G01K 7/16 257/468 |
| 2008/0156105 | A1 | * | 7/2008 | Ishikawa ............... G01F 1/3209 73/861.22 |
| 2009/0028215 | A1 | * | 1/2009 | Dohi ........................ G01J 5/02 374/208 |
| 2012/0160032 | A1 | | 6/2012 | Habersetzer et al. |
| 2015/0068323 | A1 | * | 3/2015 | Fukano ................. G01F 1/3209 73/861.22 |
| 2016/0090978 | A1 | * | 3/2016 | Kim .................. H05K 7/20172 165/104.34 |
| 2016/0356769 | A1 | * | 12/2016 | Shih ................. G01N 33/54373 |

FOREIGN PATENT DOCUMENTS

| | | | | |
|---|---|---|---|---|
| JP | H11166843 | A | 6/1999 | |
| JP | 3073072 | B2 | 7/2000 | |
| JP | 2002333352 | A | 11/2002 | |
| JP | 2004-069500 | | 3/2004 | |
| KR | 20130077855 | A * | 7/2013 | ......... H05K 7/20172 |
| WO | WO 2015100170 | A1 * | 7/2015 | ....... G01N 33/54373 |

OTHER PUBLICATIONS

European Office Action dated Oct. 11, 2018 in EP Application No. 16 190 634.2, 5 pages.

Unknown, "Piezoelectric Components", Boston Piezo-Optics, www.bostonpiezooptics.com, retrieved from the Internet: http://web.archive.org/web/20150521060804/http://bostonpiezooptics.com:80/ransducercrystals, 2015, 4 pages.

Unknown, "Piezo Ceramic Materials & Products", Physik Instrumente, retrieved from the Internet: http://www.piezo.ws/pdf/Piezo_Materials_Piezo_Technology_Piezo_Components.pdf, 2011, 44 pages.

* cited by examiner

PIEZOELECTRIC KARMAN VORTEX FLOWMETER

CROSS-REFERENCE TO RELATED APPLICATIONS

This application is based on Japanese Patent Application No. 2015-196748, the contents of which are incorporated herein by reference in its entirety.

TECHNICAL FIELD

The present disclosure relates to a Karman vortex flowmeter that measures a Karman vortex to thereby obtain a flow rate of a fluid.

BACKGROUND ART

Conventionally, there has been known a Karman vortex flowmeter that measures a flow rate by generating Karman vortexes corresponding to a flow of a fluid, detecting them, and converting them into an electrical signal (for example, refer to Japanese Unexamined Patent Application, Publication No. Hei 9-196722).

The Karman vortex flowmeter disclosed in Japanese Unexamined Patent Application, Publication No. Hei 9-196722 forms a diaphragm around a thin plate-shaped pressure-receiving plate to fix it to a pipe included in a flow passage, and detects vibration of the pressure-receiving plate due to the Karman vortexes by a vibration pick-up element arranged in a hollow portion isolated from the flow passage by the diaphragm.

SUMMARY

Technical Problem

Since the Karman vortex flowmeter disclosed in Japanese Unexamined Patent Application, Publication No. Hei 9-196722 has a comparatively complex structure of isolating the vibration pick-up element from the flow passage by the diaphragm, manufacturing cost thereof is increased. In addition, since the vibration pick-up element is arranged at a position isolated from the flow passage, detection accuracy of vibration, etc. may not be sufficiently enhanced.

Meanwhile, as disclosed as a conventional technology in Japanese Unexamined Patent Application, Publication No. Hei 9-196722, in a case of a structure in which a vortex detector housed in a pressure-receiving piece is arranged in the flow passage, corrosive gas generated from the fluid may permeate the pressure-receiving piece to then corrode the vortex detector.

The present disclosure has been made in view of such circumstances, and an object thereof is to provide a Karman vortex flowmeter that can suppress corrosion of an electrode of a piezoelectric element due to corrosive gas that permeates a resin material housing the piezoelectric element.

Solution to Problem

The present disclosure employs the following solutions in order to solve the above-described problems.

A Karman vortex flowmeter according to one aspect of the present disclosure includes: a main body inside which a flow passage through which a fluid flows along a flow direction, and a vortex generator that generates Karman vortexes in the fluid flowing through the flow passage are formed; and a flow rate measurement unit that is arranged on a downstream side of the vortex generator in the flow direction, and measures the Karman vortexes generated by the vortex generator to thereby obtain a flow rate of the fluid. Additionally, in the above-described Karman vortex flowmeter, the flow rate measurement unit includes: a piezoelectric element that has a piezoelectric material formed in a plate shape, and an electrode that is joined to the piezoelectric material; a housing unit that houses the piezoelectric element thereinside, and is attached to the main body so that the piezoelectric element is arranged in the flow passage; and a thin film part that is formed of a material with higher corrosion resistance than the electrode. Further, in the above-described Karman vortex flowmeter, the housing unit houses the piezoelectric element in a state where the piezoelectric element is sandwiched by a pair of plate-shaped parts integrally formed of a resin material, and the thin film part is arranged between the plate-shaped part and the electrode.

According to the Karman vortex flowmeter according to one aspect of the present disclosure, the piezoelectric element that has the piezoelectric material formed in the plate shape, and the electrode joined thereto is housed in the housing unit in the state of being sandwiched by the pair of plate-shaped parts integrally formed of the resin material, and is arranged in the flow passage. In a case where corrosive gas is generated from the fluid (for example, hydrofluoric acid) that flows through the flow passage, although the corrosive gas that has permeated the pair of plate-shaped parts enters an inside of the housing unit arranged in the flow passage, the thin film part formed of the material with higher corrosion resistance than the electrode is arranged between the plate-shaped part and the electrode, and thus corrosion of the electrode is suppressed.

As described above, according to the Karman vortex flowmeter according to one aspect of the present disclosure, there can be provided the Karman vortex flowmeter that can suppress corrosion of the electrode of the piezoelectric element due to the corrosive gas that permeates the resin material housing the piezoelectric element.

In the Karman vortex flowmeter according to one aspect of the present disclosure, the piezoelectric element may include a pair of the electrodes joined to a first surface and a second surface of the piezoelectric material, and a pair of the thin film parts may be arranged between the pair of plate-shaped parts and the pair of electrodes.

By configuring the Karman vortex flowmeter as described above, the pair of electrodes joined to the first surface and the second surface of the piezoelectric material formed in the plate shape can be suppressed from being corroded by the corrosive gas that has permeated the pair of plate-shaped parts.

The Karman vortex flowmeter according to one aspect of the present disclosure may be configured such that a thickness of the thin film part is set to be not less than $\frac{1}{20}$ and not more than $\frac{1}{5}$ of a thickness of the piezoelectric element.

By configuring the Karman vortex flowmeter as described above, the thickness of the thin film part is set to be not less than $\frac{1}{20}$ of the thickness of the piezoelectric element, and thereby corrosion of the electrode due to the corrosive gas can be sufficiently suppressed by the thin film part. In addition, the thickness of the thin film part is set to be not more than $\frac{1}{5}$ of the thickness of the piezoelectric element to thereby sufficiently lower rigidity of the thin film part, and vibration due to the Karman vortexes transmitted from the plate-shaped part can be reliably transmitted to the piezoelectric element through the thin film part.

In the above-described configuration, the thickness of the piezoelectric element may be set to be not less than 0.3 mm and not more than 0.4 mm, and the thickness of the thin film part may be set to be not less than 20 μm and not more than 60 μm.

By configuring the Karman vortex flowmeter as described above, corrosion of the electrode due to the corrosive gas can be sufficiently suppressed by the thin film part, and rigidity of the thin film part is sufficiently lowered, whereby vibration due to the Karman vortexes transmitted from the plate-shaped part can be reliably transmitted to the piezoelectric element through the thin film part.

In the Karman vortex flowmeter according to one aspect of the present disclosure, the thin film part may be joined to the electrode by an adhesive.

By configuring the Karman vortex flowmeter as described above, the electrode of the piezoelectric element can be suppressed from being corroded due to the corrosive gas, while assembly of the Karman vortex flowmeter is facilitated by comparatively simple work of joining the thin film part to the electrode with the adhesive. In addition, surroundings of the thin film part are filled with the adhesive, thereby transmissibility of the vibration due to the Karman vortexes can be improved, and sensitivity of the piezoelectric element can be improved in connection with the improvement of the transmissibility of the vibration.

In the Karman vortex flowmeter according to one aspect of the present disclosure, the thin film part may be formed at the electrode by vapor deposition.

By configuring the Karman vortex flowmeter as described above, the thin film part is formed at the electrode by vapor deposition, and thereby the electrode of the piezoelectric element can be suppressed from being corroded due to the corrosive gas, while assembly of the Karman vortex flowmeter is facilitated since a process of making the thin film part adhere to the electrode becomes unnecessary.

Advantageous Effects

According to the present disclosure, there can be provided the Karman vortex flowmeter that can suppress corrosion of the electrode of the piezoelectric element due to the corrosive gas that permeates the resin material housing the piezoelectric element.

DESCRIPTION OF EMBODIMENTS

{First Embodiment}

Hereinafter, a Karman vortex flowmeter of a first embodiment of the present disclosure will be explained with reference to drawings.

Figure 1:
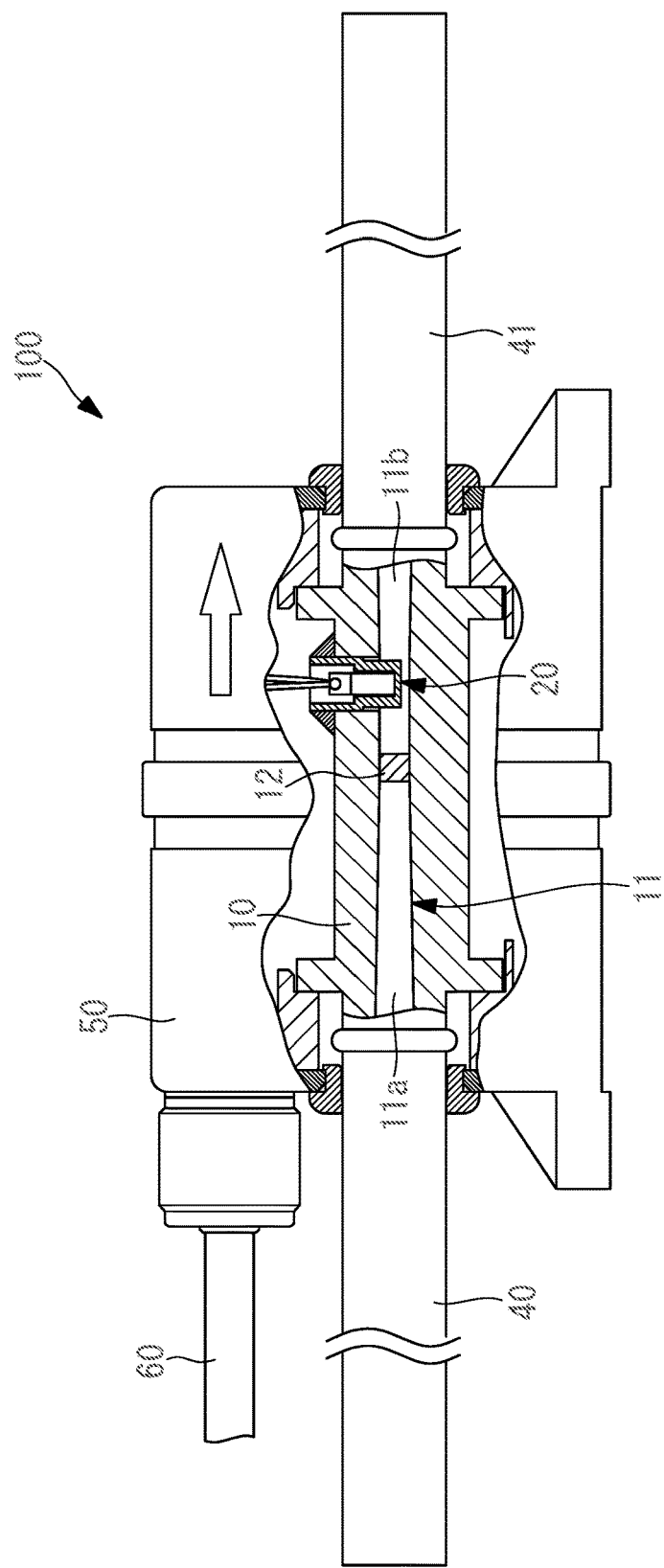
FIG. 1 is a partial longitudinal cross-sectional view showing a Karman vortex flowmeter of a first embodiment.

As shown in FIG. 1, a Karman vortex flowmeter 100 of the embodiment includes: a body (a main body) 10 inside which a flow passage 11 through which a fluid flows along a flow direction (a direction from left toward right in FIG. 1) has been formed; a flow rate measurement unit 20 that measures a flow rate of the fluid that flows through the flow passage 11; an inflow passage member 40 inside which an inflow passage that is communicated with an inflow port 11a of the flow passage 11 of the body 10 is formed; an outflow passage member 41 inside which an outflow passage that is communicated with an outflow port 11b of the flow passage 11 of the body 10 is formed; a casing 50 that houses the body 10 and a control board (illustration is omitted) thereinside; and a cable 60 for communicating with an external control device (illustration is omitted), the cable 60 being connected to the control board.

The Karman vortex flowmeter 100 of the embodiment makes various liquids flow through the flow passage 11, and measures flow rates thereof. The liquids that flow through the flow passage 11 are, for example, hydrofluoric acid, hydrochloric acid, nitric acid, ozone water, etc. Corrosive gas, such as hydrogen fluoride, hydrogen chloride, nitric acid, and ozone, is generated from the liquids.

The body 10, the inflow passage member 40, and the outflow passage member 41 included in the Karman vortex flowmeter 100 of the embodiment are formed of a fluorine resin material, such as PFA (Tetrafluoroethylene/Perfluoroalkylvinylether Copolymer). In the flow rate measurement unit 20, other portions excluding a piezoelectric element 21, and thin film parts 30 and 31 that will be mentioned later are formed of the fluorine resin material, such as PFA.

While the fluorine resin material is the material having heat resistance and chemical resistance, it has gas permeability. Therefore, in a case where a thickness of the fluorine resin material is thin, corrosive gas, such as hydrogen fluoride, hydrogen chloride, nitric acid, and ozone, may permeate the fluorine resin material.

Next, the body 10 included in the Karman vortex flowmeter 100 will be explained.

Figure 2:
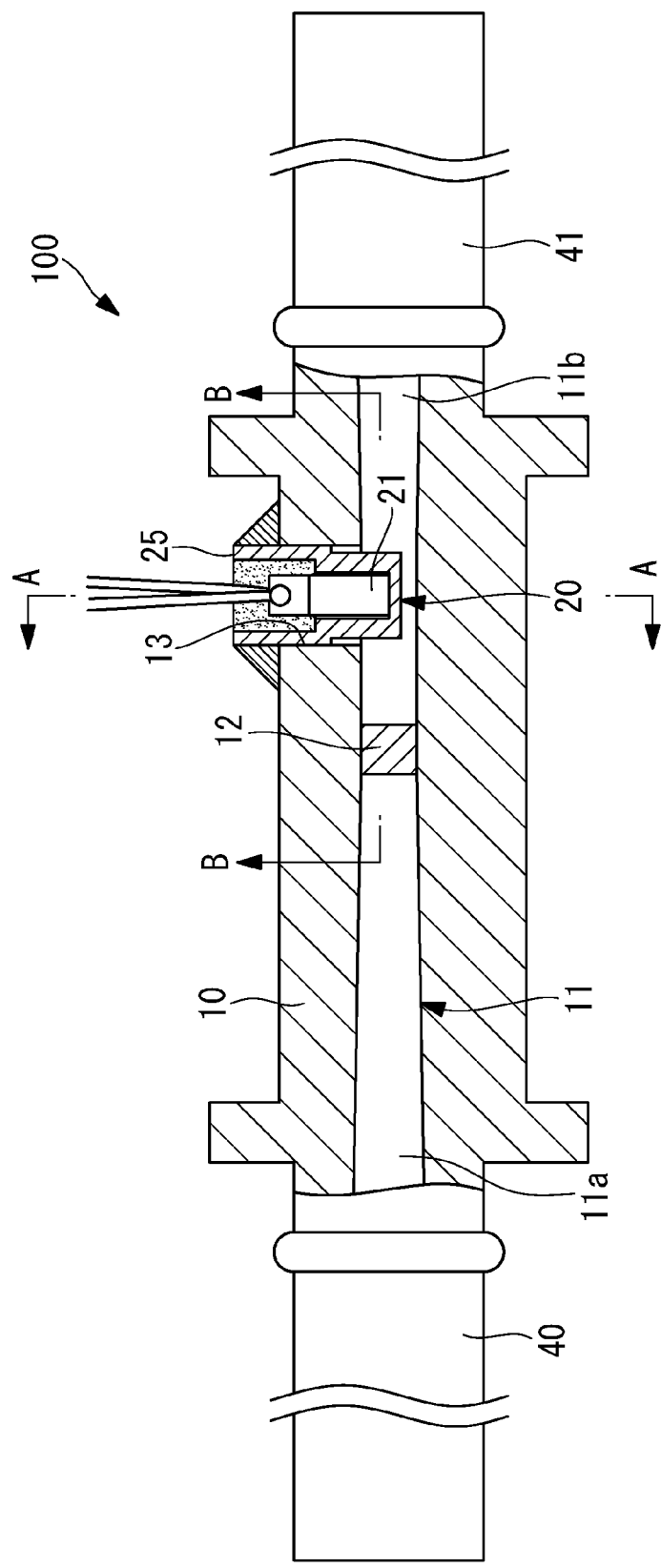
FIG. 2 is a partial longitudinal cross-sectional view showing a main portion of the Karman vortex flowmeter of the first embodiment.

FIG. 2 is a partial longitudinal cross-sectional view showing a main portion of the Karman vortex flowmeter 100 of the first embodiment, in which the casing 50 and the cable 60 shown in FIG. 1 are omitted.

As shown in FIG. 2, inside the body 10, a Karman vortex generation column (a vortex generator) 12 is formed on an upstream side along the flow direction of the fluid, and the flow rate measurement unit 20 is arranged on a downstream side of the Karman vortex generation column 12 in the flow direction. The Karman vortex generation column 12 is a columnar member that generates Karman vortexes KV (refer to FIG. 5) in the fluid flowing through the flow passage 11.

As shown in FIG. 2, an insertion hole 13 into which the flow rate measurement unit 20 is inserted is formed in the body 10.

Figure 8:
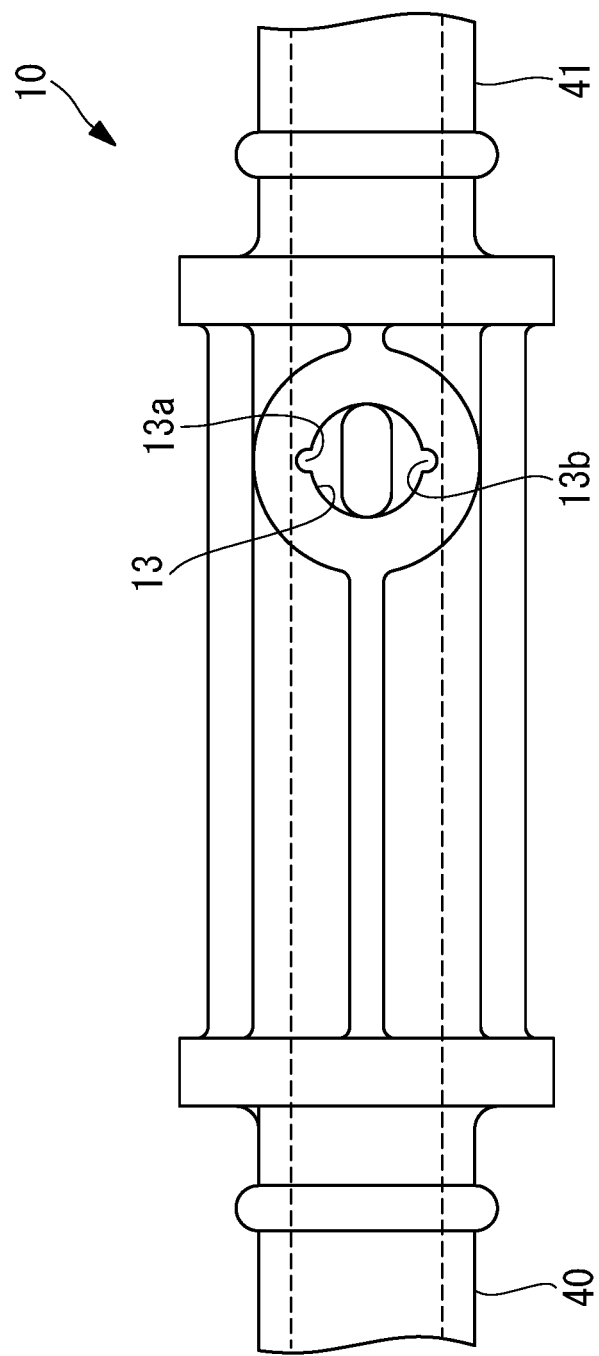
FIG. 8 is a plan view of a body shown in FIG. 2.

As shown in FIG. 8 (a plan view of the body shown in FIG. 2), in an inner peripheral surface of the insertion hole 13, there are formed a concave groove 13a and a concave groove 13b for holding the flow rate measurement unit 20 inserted into the insertion hole 13 so that the flow rate measurement unit 20 does not rotate around the insertion hole 13.

Figure 3:
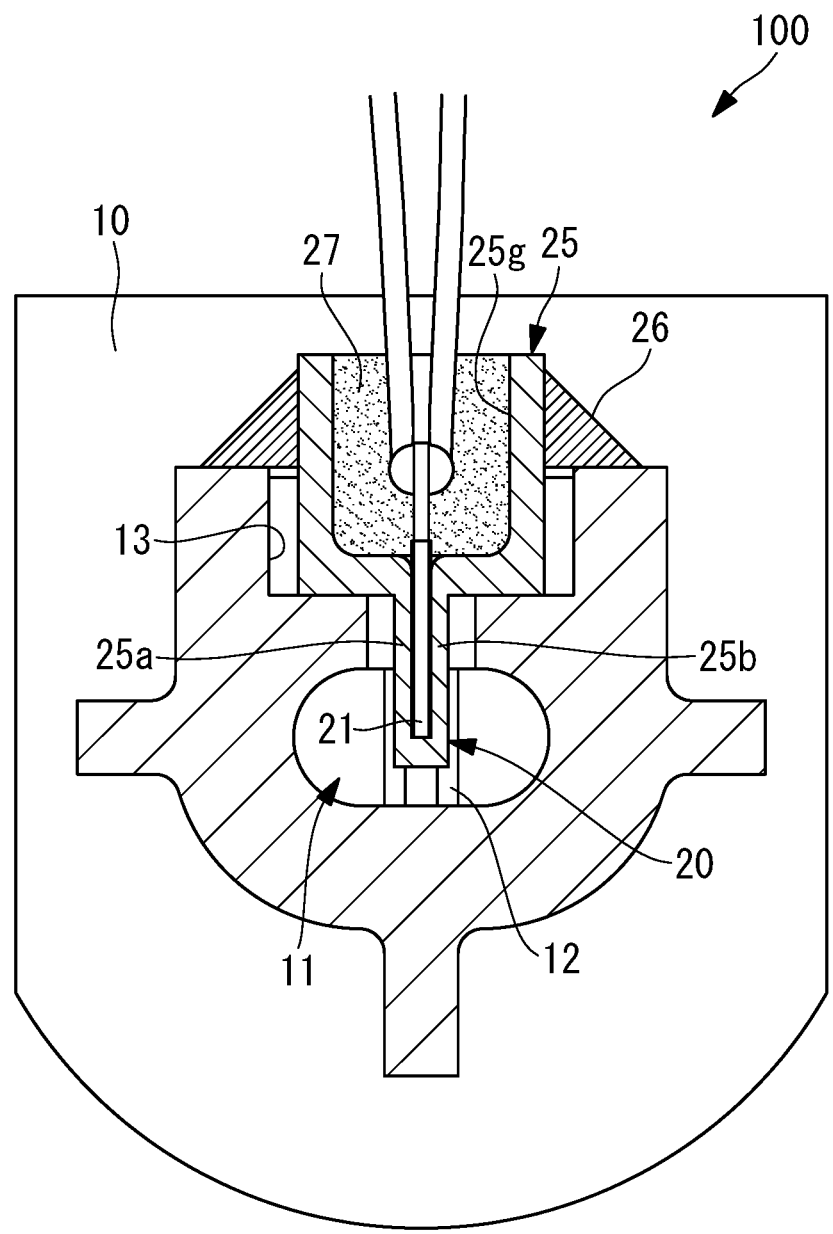
FIG. 3 is a cross-sectional view of the Karman vortex flowmeter shown in FIG. 2 taken along a line A-A.

As shown in FIG. 3 (a cross-sectional view of the Karman vortex flowmeter 100 shown in FIG. 2 taken along a line A-A), a shape of the flow passage 11 formed inside the body 10 in the cross-sectional view is substantially elliptical. The Karman vortex generation column 12 formed inside the body 10 is formed in a columnar shape coupled to each of a bottom and a top of the flow passage 11.

Figure 5:
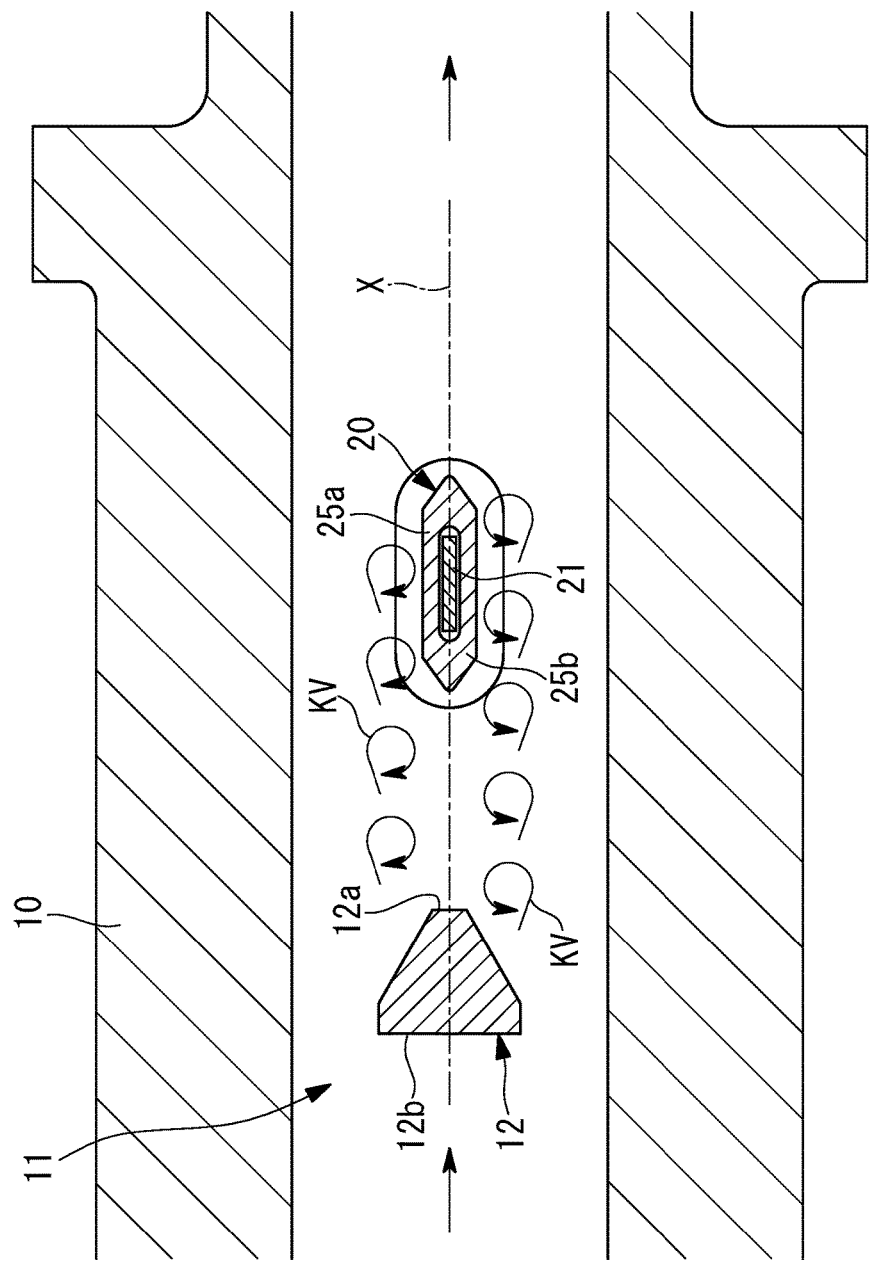
FIG. 5 is a cross-sectional view of the Karman vortex flowmeter shown in FIG. 2 taken along a line B-B.

As shown in FIG. 5 (a cross-sectional view of the Karman vortex flowmeter 100 shown in FIG. 2 taken along a line B-B), a cross-sectional shape of the Karman vortex generation column 12 is formed substantially in a triangle. The cross-sectional shape of the Karman vortex generation column 12 is the shape having a top 12a on the downstream side and a bottom 12b on the upstream side.

Therefore, when the fluid that flows along the flow direction collides with the bottom 12b of the Karman vortex generation column 12, two vortex streets each including the plurality of Karman vortexes KV are formed at positions having a regular interval in a width direction centering on an axis line X that passes through a center of the flow passage 11 in the width direction.

As shown in FIG. 5, positions where the plurality of Karman vortexes KV included in one vortex street are located along the axis line X, and positions where the plurality of Karman vortexes KV included in the other vortex street are located along the axis line X are different from each other, respectively. Specifically, the plurality of Karman vortexes KV included in the other vortex street are arranged among the positions where the plurality of Karman vortexes KV included in one vortex street are located along the axis line X.

The Karman vortexes KV shown in FIG. 5 show the ones formed by the fluid that flows through the flow passage 11 at a certain point. The Karman vortexes KV move along the flow direction, holding a relative positional relation shown in FIG. 5.

Next, the flow rate measurement unit 20 included in the Karman vortex flowmeter 100 will be explained. The flow rate measurement unit 20 is a device that measures Karman vortexes generated by the Karman vortex generation column 12 to thereby obtain a flow rate of a fluid.

Figure 4:
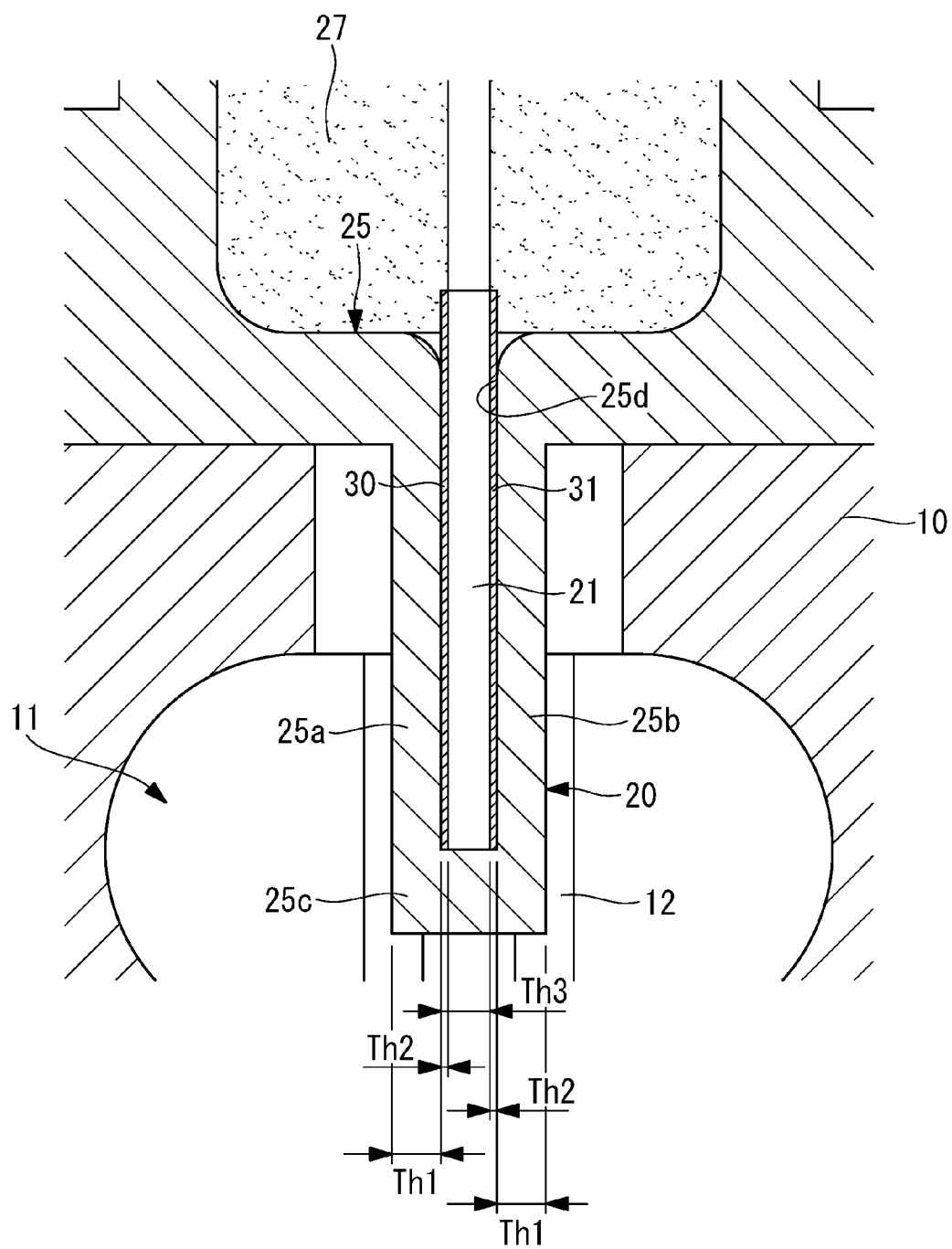
FIG. 4 is a partially enlarged view of the Karman vortex flowmeter shown in FIG. 3.

As shown in FIGS. 3 and 4 (a partially enlarged view of the Karman vortex flowmeter shown in FIG. 3), the flow rate measurement unit 20 has: the piezoelectric element 21 that outputs a voltage according to vibration given from an outside; a piezoelectric element holder (a housing unit) 25 that houses the piezoelectric element 21 thereinside; and a pair of the thin film parts 30 and 31 that is arranged at a surface of the piezoelectric element 21.

Here, the piezoelectric element 21 will be explained.

Figure 11:
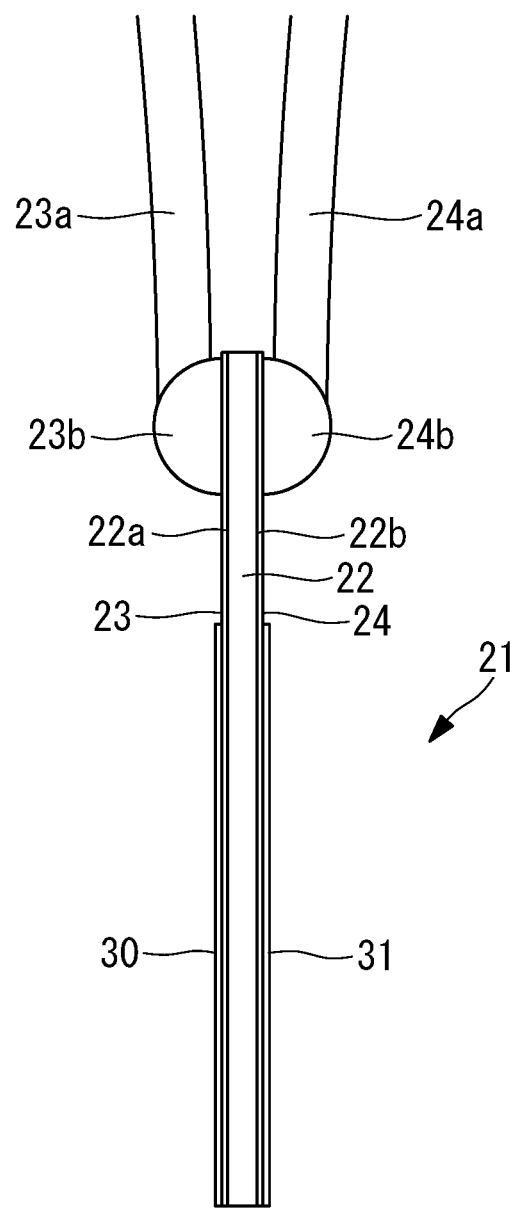
FIG. 11 is a side view of a piezoelectric element shown in FIG. 2.

As shown in FIG. 11 (a side view of the piezoelectric element shown in FIG. 2), the piezoelectric element 21 has: a piezoelectric material 22 that is formed in a plate shape; and a pair of electrodes 23 and 24 that is joined to a first surface 22a and a second surface 22b of the piezoelectric material 22. The electrode 23 is joined so as to cover the whole first surface 22a of the piezoelectric material 22, and is connected to an electric wire 23a through a solder joining part 23b so as to be electrically conducted thereto. Similarly, the electrode 24 is joined so as to cover the whole second surface 22b of the piezoelectric material 22, and is connected to an electric wire 24a through a solder joining part 24b so as to be electrically conducted thereto.

The electrodes 23 and 24 are, for example, formed of silver, or an alloy of silver and palladium.

The piezoelectric material 22 is the material that generates a voltage by being deformed by vibration etc. given from the outside. Vibration in the embodiment is the one transmitted to the piezoelectric material 22 by the Karman vortexes KV through the piezoelectric element holder 25. As the piezoelectric material 22, for example, piezoelectric ceramics, such as lead zirconate titanate $(Pb(Zr, Ti)O_3)$, which is a ferroelectric having Perovskite-type crystal structure, is used.

Since the electrode 23 is joined to the first surface 22a of the piezoelectric material 22, and the electrode 24 is joined to the second surface 22b thereof, voltages according to deformation of the piezoelectric material 22 are generated at the electrodes 23 and 24. The electric wires 23a and 24a that are electrically conducted to the electrodes 23 and 24 are connected to the control board (illustration is omitted housed in the casing 50. The control board measures a frequency of vibration (a frequency of the Karman vortexes KV transmitted to the piezoelectric material 22 by the Karman vortexes KV through the piezoelectric element holder 25 by detecting fluctuations in a voltage difference between the electric wires 23a and 24a, and calculates the flow rate of the fluid that flows through the flow passage 11 according to a measurement result.

Next, the piezoelectric element holder 25 will be explained.

The piezoelectric element holder 25 is a member in which a pair of plate-shaped parts 25a and 25b, and a bottom 25c are integrally formed by a fluorine resin material as shown in FIG. 4. The piezoelectric element holder 25 has a holding hole 25d formed in a bag shape by the pair of plate-shaped parts 25a and 25b and the bottom 25c.

The piezoelectric element holder 25 is housed in the holding hole 25d in a state where the piezoelectric element 21 is sandwiched by the pair of plate-shaped parts 25a and 25b.

Figure 9:
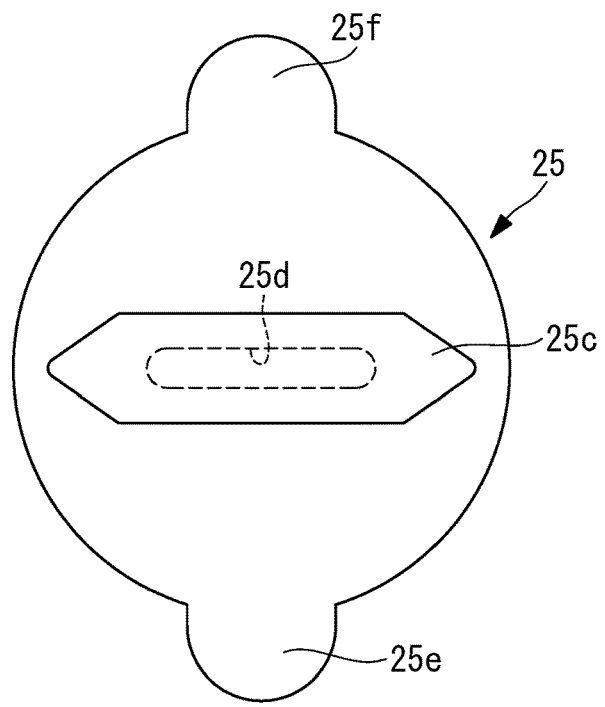
FIG. 9 is a bottom view of a piezoelectric element holder shown in FIG. 2.
Figure 10:
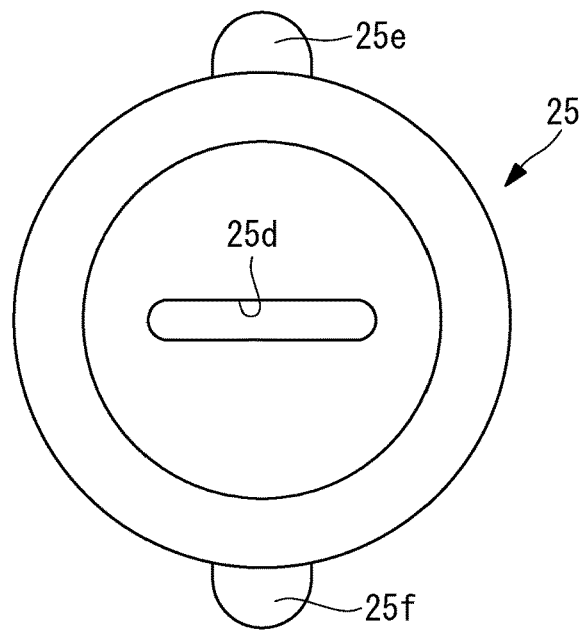
FIG. 10 is a plan view of the piezoelectric element holder shown in FIG. 2.

As shown in FIG. 9 (a bottom view of the piezoelectric element holder 25 shown in FIG. 2) and FIG. 10 (a plan view of the piezoelectric element holder 25 shown in FIG. 2), a pair of convex portions 25e and 25f is formed at an outer peripheral surface of the piezoelectric element holder 25. In the piezoelectric element holder 25 being attached to the body 10, the convex portion 25e is inserted into the concave groove 13a, and the convex portion 25f is inserted into the concave groove 13b, and thereby the flow rate measurement unit 20 is held by the body 10 so as not to rotate around the insertion hole 13.

As shown in FIG. 3, the piezoelectric element holder 25 is inserted into the insertion hole 13 of the body 10 so that the piezoelectric element 21 held by the pair of plate-shaped parts 25a and 25b is arranged in the flow passage 11. The piezoelectric element holder 25 is welded by a welding material including the same fluorine resin material as the body 10 and the piezoelectric element holder 25 in a state of being inserted into the insertion hole 13 of the body 10. By the welding work, a welding part 26 that fixes the piezoelectric element holder 25 to the body 10 is formed, and the fluid that flows through the flow passage 11 is prevented from leaking from a joined portion of the piezoelectric element holder 25 and the body 10.

A recess 25g formed in the piezoelectric element holder is filled with a filling material 27 made of a resin material. The recess 25g is filled with the filling material 27, and the filling material 27 is then solidified, whereby the piezoelectric element 21 is fixed to the piezoelectric element holder 25.

Figure 6:
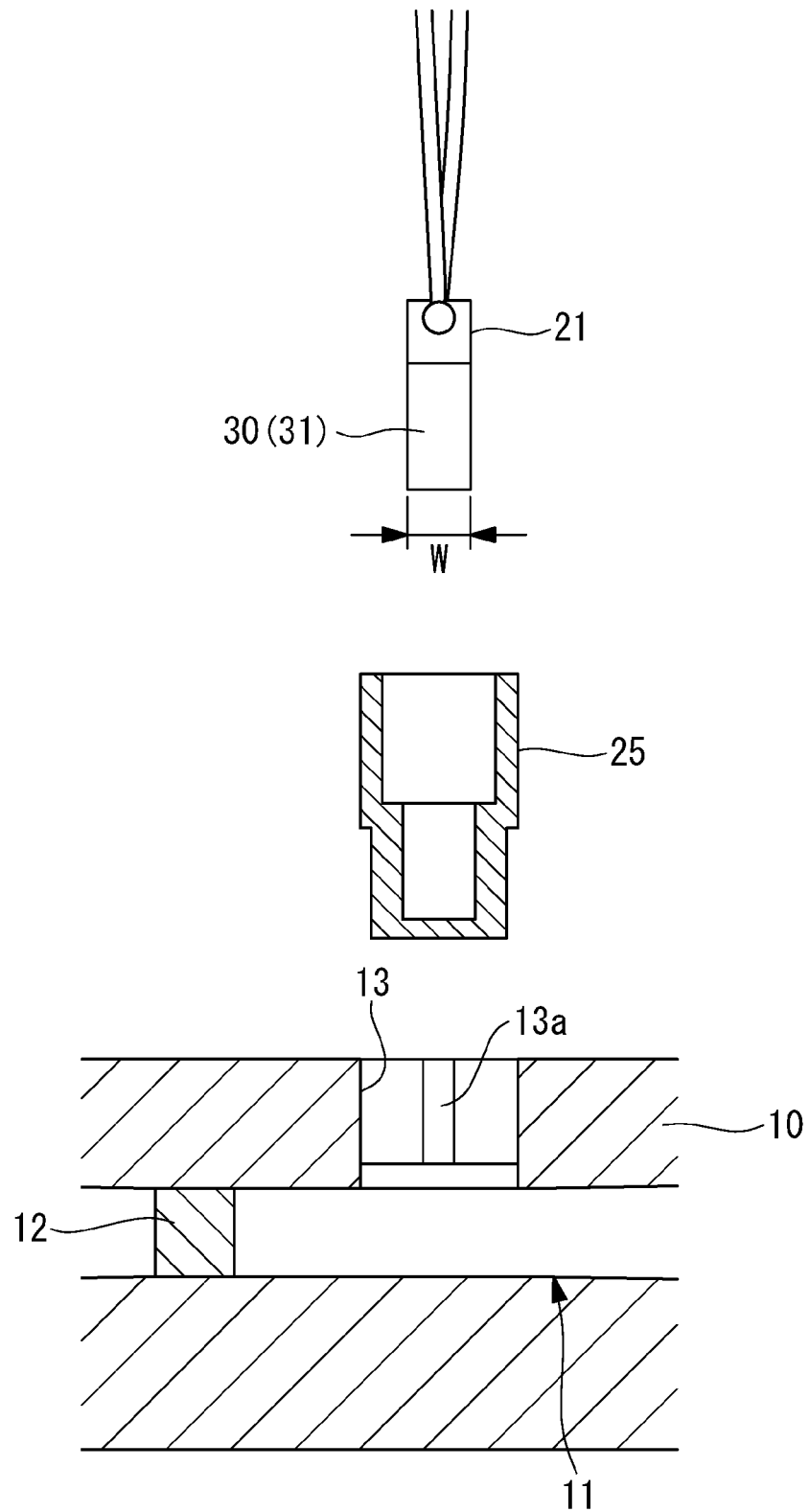
FIG. 6 is a view showing a state where a piezoelectric element holder and a piezoelectric element are removed from a body.

FIG. 6 is a view showing a state where the piezoelectric element holder 25 and the piezoelectric element 21 are removed from the body 10. In addition, FIG. 7 is a view showing a state where the piezoelectric element holder 25 is joined to the body 10.

Figure 7:
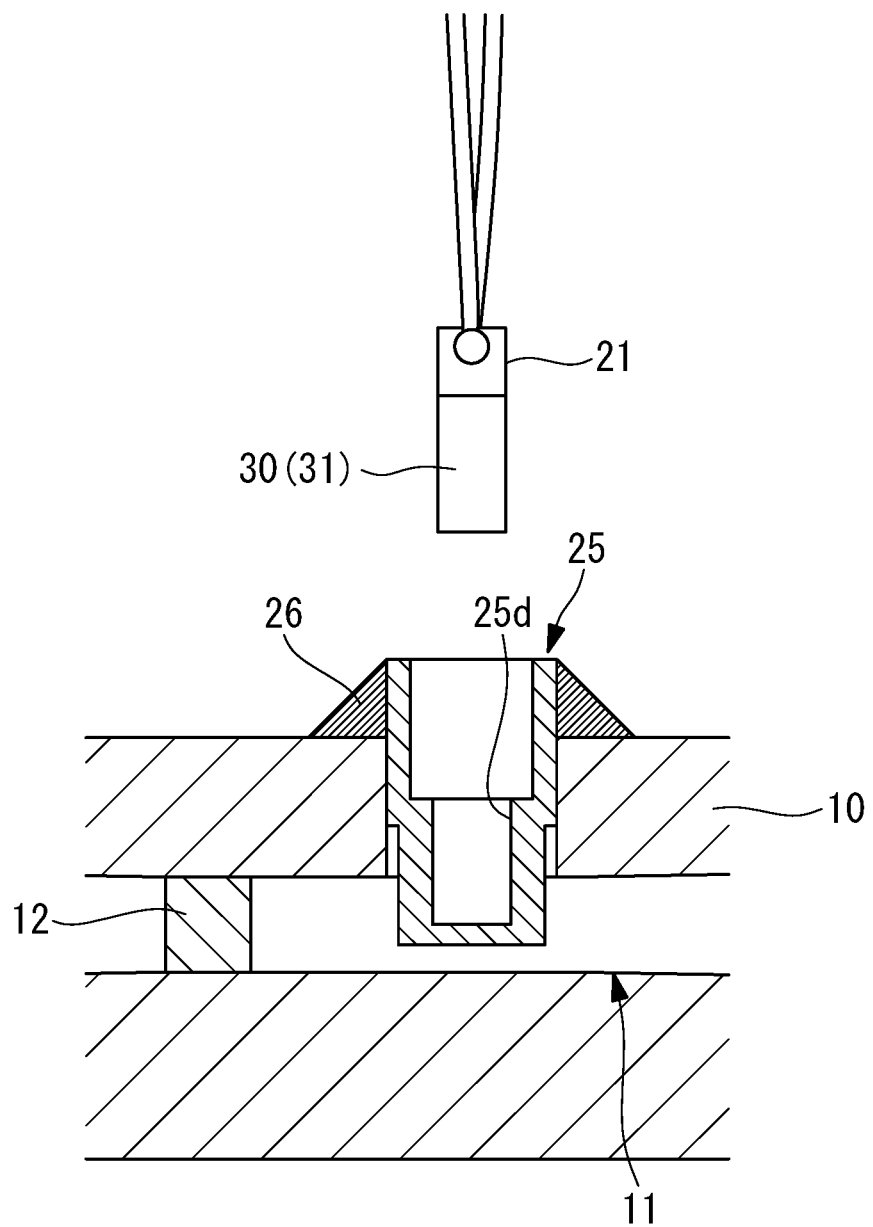
FIG. 7 is a view showing a state where the piezoelectric element holder is joined to the body.

In the Karman vortex flowmeter 100 shown in FIG. 3 being manufactured, the piezoelectric element holder 25 is inserted into the insertion hole 13 of the body 10 from the state shown in FIG. 6, and thereby the state of FIG. 6 is changed to the state shown in FIG. 7.

Next, welding work is performed in a state where the piezoelectric element holder 25 is inserted into the insertion hole 13, and the welding part 26 that fixes the piezoelectric element holder 25 to the body 10 is formed.

Lastly, the piezoelectric element 21 is inserted into the holding hole 25d of the piezoelectric element holder 25, the recess 25g is filled with the filling material 27, and the state of FIG. 7 is changed to a state shown in FIG. 4. Note that the pair of thin film parts 30 and 31 shall be previously joined to the piezoelectric element 21. A reason why the piezoelectric element holder 25 is fixed to the body 10 before the piezoelectric element 21 is inserted into the holding hole 25d of the piezoelectric element holder 25 is that heat in the welding part 26 being formed is kept from being transferred to the piezoelectric element 21.

As shown in FIG. 5, the pair of plate-shaped parts 25a and 25b of the piezoelectric element holder 25 is arranged in a direction that coincides with the flow direction (an axis line X direction) of the fluid. Therefore, the piezoelectric element 21 held by the pair of plate-shaped parts 25a and 25b becomes a state where a direction in which surfaces of the electrodes 23 and 24 are arranged coincides with the flow direction (the axis line X direction) of the fluid. Therefore, the piezoelectric element 21 receives on an electrode 23 side vibration due to one of two vortex streets including the plurality of Karman vortexes KV, and receives on an electrode 24 side vibration due to the other vortex street. Therefore, the piezoelectric element 21 outputs a voltage according to vibration in connection with passing of the Karman vortexes KV included in the alternately generated two vortex streets.

Next, the thin film parts 30 and 31 will be explained.

As shown in FIG. 4, the pair of thin film parts 30 and 31 is a member that has higher corrosion resistance than the pair of electrodes 23 and 24, and is formed in a film shape by a metal material that does not make corrosive gas permeate. For example, aluminum and stainless steel can be used for a material of which the thin film parts 30 and 31 are formed. In addition, for example, nickel alloys, such as Inconel (registered trademark) and Hastelloy (registered trademark), can be used.

As shown in FIG. 4, the pair of thin film parts 30 and 31 are arranged between the pair of plate-shaped parts 25a and 25b and the piezoelectric element 21 (the pair of electrodes 23 and 24 shown in FIG. 11). The thin film part 30 is arranged so as to cover a whole surface of the electrode 23 of the piezoelectric element 21 held by the plate-shaped part 25a to thereby protect the electrode 23 from corrosive gas. Similarly, the thin film part 31 is arranged so as to cover a whole surface of the electrode 24 of the piezoelectric element 21 held by the plate-shaped part 25b to thereby protect the electrode 24 from the corrosive gas.

As shown in FIG. 4, a thickness of the thin film parts 30 and 31 is Th2, a thickness of the pair of plate-shaped parts 25a and 25b of the piezoelectric element holder 25 is Th1, and a thickness of the piezoelectric element 21 is Th3. Th1, Th2, and Th3 are desirably set to be in a range shown in the following Expressions.

$$0.3 \text{ mm} \leq Th1 \leq 0.8 \text{ mm} \tag{1}$$

$$20 \text{ μm} \leq Th2 \leq 60 \text{ μm} \tag{2}$$

$$0.3 \text{ mm} \leq Th3 \leq 0.4 \text{ mm} \tag{3}$$

Note that the following Expression (4) is derived from Expressions (2) and (3).

$$1/20 \leq Th2/Th3 \leq 1/5 \tag{4}$$

Expression (4) shows that the thickness Th2 of the thin film parts 30 and 31 is not less than 1/20 and not more than 1/5 of the thickness Th3 of the piezoelectric element 21.

As shown in FIG. 6, a width of the thin film parts 30 and and a width of the piezoelectric element 21 are W, respectively, which coincides with each other. Therefore, whole surfaces of the electrodes 23 and 24 in a width direction are in a state of being covered with the thin film parts 30 and 31, the electrodes 23 and 24 being arranged at the surface of the piezoelectric element 21.

The thin film parts 30 and 31 can be formed by joining a metal thin film formed in a sheet shape to the electrodes 23 and 24 by an adhesive. In addition, the thin film parts 30 and 31 may be formed on surfaces of the electrodes 23 and 24 by vapor deposition. Vapor deposition is treatment in which a metal material is heated and vaporized to form a thin film on a surface of a target object.

Here, there will be explained a process of attaching to the pair of plate-shaped parts 25a and 25b of the piezoelectric element holder 25 the piezoelectric element 21 to which the thin film parts 30 and 31 have been joined by the adhesive, or the piezoelectric element 21 on which the thin film parts 30 and 31 have been formed by vapor deposition.

In a case where the thin film parts 30 and 31 are joined to the piezoelectric element 21 by the adhesive as shown in FIG. 11, or where the thin film parts 30 and 31 are formed on the piezoelectric element 21 by vapor deposition, an appropriate amount of adhesive is applied to outer peripheral surfaces of the thin film parts 30 and 31 as a first process. The appropriate amount of adhesive means an amount small enough for the adhesive not to leak from a space between the pair of plate-shaped parts 25a and 25b while the space is filled with the adhesive, in a case where the piezoelectric element 21 is inserted between the pair of plate-shaped parts 25a and 25b.

Next, as a second process, the piezoelectric element 21 to which the adhesive has been applied is inserted between the pair of plate-shaped parts 25a and 25b. When the piezoelectric element 21 is inserted between the pair of plate-shaped parts 25a and 25b, the Karman vortex flowmeter 100 becomes a state where a space between inner peripheral surfaces of the pair of plate-shaped parts 25a and 25b, and the outer peripheral surfaces (the surfaces to which the adhesive has been applied) of the thin film parts 30 and 31 is filled with the adhesive.

Lastly, as a third process, the adhesive is dried in a state where the piezoelectric element 21 is inserted between the pair of plate-shaped parts 25a and 25b, and the piezoelectric element 21 is fixed between the pair of plate-shaped parts 25a and 25b.

In a manner as described above, the piezoelectric element 21 shown in FIG. 11 can be attached between the pair of plate-shaped parts 25a and 25b.

Next, there will be explained the other Modified Example in which the piezoelectric element 21 is attached between the pair of plate-shaped parts 25a and 25b.

Figure 12:
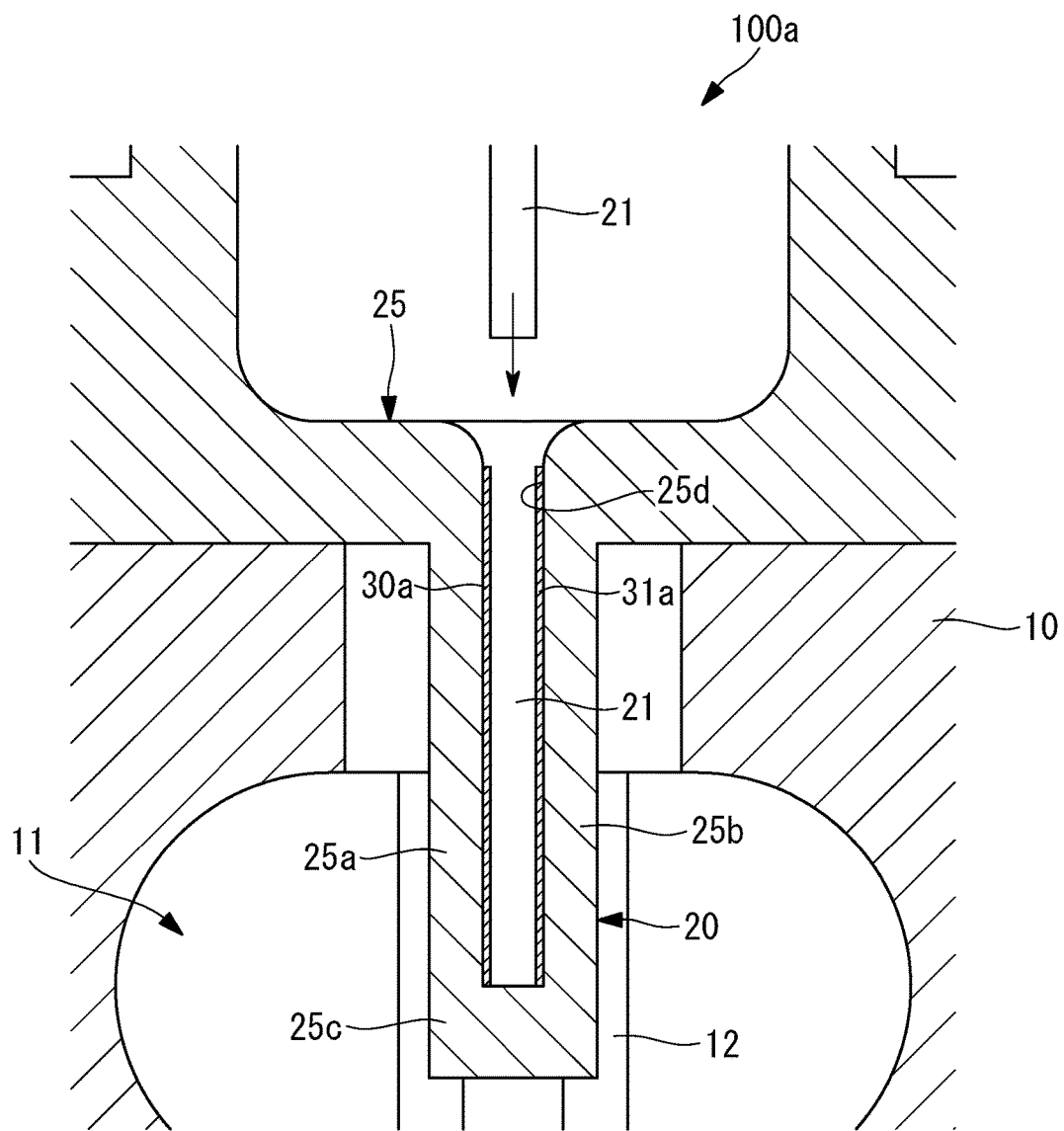
FIG. 12 is a longitudinal cross-sectional view showing a Modified Example in which a piezoelectric element is attached to a pair of plate-shaped parts of a Karman vortex flowmeter.

A Karman vortex flowmeter 100a according to the Modified Example is an example in which as shown in FIG. 12, thin film parts 30a and 31a are previously inserted between the pair of plate-shaped parts 25a and 25b, and in which subsequently, the piezoelectric element 21 is attached.

In the Modified Example, as a first process, the thin film parts 30a and 31a are inserted between the pair of plate-shaped parts 25a and 25b. In this case, the thin film parts 30a and 31a are inserted between the pair of plate-shaped parts 25a and 25b without an adhesive being applied.

Next, as a second process, an appropriate amount of adhesive is applied to an outer peripheral surface of the piezoelectric element 21 to which the thin film parts 30a and 31a are not joined. The appropriate amount of adhesive means an amount small enough for the adhesive not to leak from a space between the pair of plate-shaped parts 25a and 25b while a space between the thin film parts 30a and 31a and the piezoelectric element 21, and a space between the thin film parts 30a and 31a and the pair of plate-shaped parts 25a and 25b are filled with the adhesive, in a case where the piezoelectric element 21 is inserted between the pair of plate-shaped parts 25a and 25b.

Next, as a third process, the piezoelectric element 21 to which the adhesive has been applied is inserted between the pair of plate-shaped parts 25a and 25b. When the piezoelectric element 21 is inserted between the pair of plate-shaped parts 25a and 25b, the Karman vortex flowmeter 100a becomes a state where the space between the thin film parts 30a and 31a and the piezoelectric element 21, and the space between the thin film parts 30a and 31a and the pair of plate-shaped parts 25a and 25b are filled with the adhesive. Namely, the adhesive applied to the outer peripheral surface of the piezoelectric element 21 spreads around both the space between the thin film parts 30a and 31a and the piezoelectric element 21, and the space between the thin film parts 30a and 31a and the pair of plate-shaped parts 25a and 25b.

Lastly, as a fourth process, the adhesive is dried in a state where the piezoelectric element 21 is inserted between the pair of plate-shaped parts 25a and 25b, and the thin film parts 30a and 31a are fixed to the piezoelectric element 21, and are fixed also to the pair of plate-shaped parts 25a and 25b.

In a manner as described above, the piezoelectric element 21 shown in FIG. 12 can be attached between the pair of plate-shaped parts 25a and 25b.

Actions and effects exerted by the Karman vortex flowmeter 100 of the embodiment explained above will be explained.

According to the Karman vortex flowmeter 100 of the embodiment, the piezoelectric element 21 that has the piezoelectric material 22 formed in a plate shape, and the electrodes 23 and 24 joined thereto is housed in the piezoelectric element holder 25 and is arranged in the flow passage 11, in a state of being sandwiched by the pair of plate-shaped parts 25a and 25b integrally formed of the fluorine resin material.

In a case where corrosive gas is generated from the fluid (for example, hydrofluoric acid) that flows through the flow passage 11, although corrosive gas that has permeated the pair of plate-shaped parts 25a and 25b enters an inside of the piezoelectric element holder 25 arranged in the flow passage 11, the thin film parts 30 and 31 formed of a metal material with higher corrosion resistance than the electrodes 23 and 24 are arranged between the plate-shaped parts 25a and 25b and the electrodes 23 and 24, and thus corrosion of the electrodes 23 and 24 is suppressed.

As described above, according to the Karman vortex flowmeter 100 of the embodiment, the electrodes 23 and 24 of the piezoelectric element 21 can be suppressed from being corroded by the corrosive gas that permeates the fluorine resin material housing the piezoelectric element 21.

In the Karman vortex flowmeter 100 of the embodiment, the piezoelectric element 21 has the pair of electrodes 23 and 24 joined to the first surface 22a and the second surface 22b of the piezoelectric material 22, and the pair of thin film parts 30 and 31 is arranged between the pair of plate-shaped parts 25a and 25b and the pair of electrodes 23 and 24.

By configuring the Karman vortex flowmeter 100 as described above, the pair of electrodes 23 and 24 joined to the first surface 22a and the second surface 22b of the piezoelectric material 22 formed in the plate shape can be suppressed from being corroded by the corrosive gas that has permeated the pair of plate-shaped parts 25a and 25b.

In the Karman vortex flowmeter 100 of the embodiment, the thickness Th2 of the thin film parts 30 and 31 is desirably set to be not less than 1/20 and not more than 1/5 of the thickness Th3 of the piezoelectric element 21. More specifically, the thickness Th3 of the piezoelectric element 21 is desirably set to be not less than 0.3 mm and not more than 0.4 mm, and the thickness Th2 of the thin film parts 30 and 31 is desirably set to be not less than 20 μm and not more than 60 μm.

By configuring the Karman vortex flowmeter 100 as described above, the thickness Th2 of the thin film parts 30 and 31 is set to be not less than 1/20 of the thickness Th3 of the piezoelectric element 21, and corrosion of the electrodes 23 and 24 due to the corrosive gas can be sufficiently suppressed by the thin film parts 30 and 31. In addition, the thickness Th2 of the thin film parts 30 and 31 is set to be not more than 1/5 of the thickness Th3 of the piezoelectric element 21 to thereby sufficiently lower rigidity of the thin film parts 30 and 31, and vibration due to the Karman vortexes KV transmitted from the plate-shaped parts 25a and 25b can be reliably transmitted to the piezoelectric element 21 through the thin film parts 30 and 31.

{Second Embodiment}

Hereinafter, a Karman vortex flowmeter 100b of a second embodiment of the present disclosure will be explained with reference to the drawings.

The Karman vortex flowmeter 100b of the embodiment is a Modified Example of the Karman vortex flowmeter 100 of the first embodiment, and shall be similar to the Karman vortex flowmeter 100 of the first embodiment unless otherwise particularly explained hereinafter.

The Karman vortex flowmeter 100 of the first embodiment is housed in the recess 25g without the piezoelectric element 21 attached to the piezoelectric element holder 25 projecting from the recess 25g of the piezoelectric element holder 25.

In contrast with that, in the Karman vortex flowmeter 100b of the embodiment, a piezoelectric element 21a attached to the piezoelectric element holder 25 is formed to have a length long enough to project from the recess 25g of the piezoelectric element holder 25.

Figure 13:
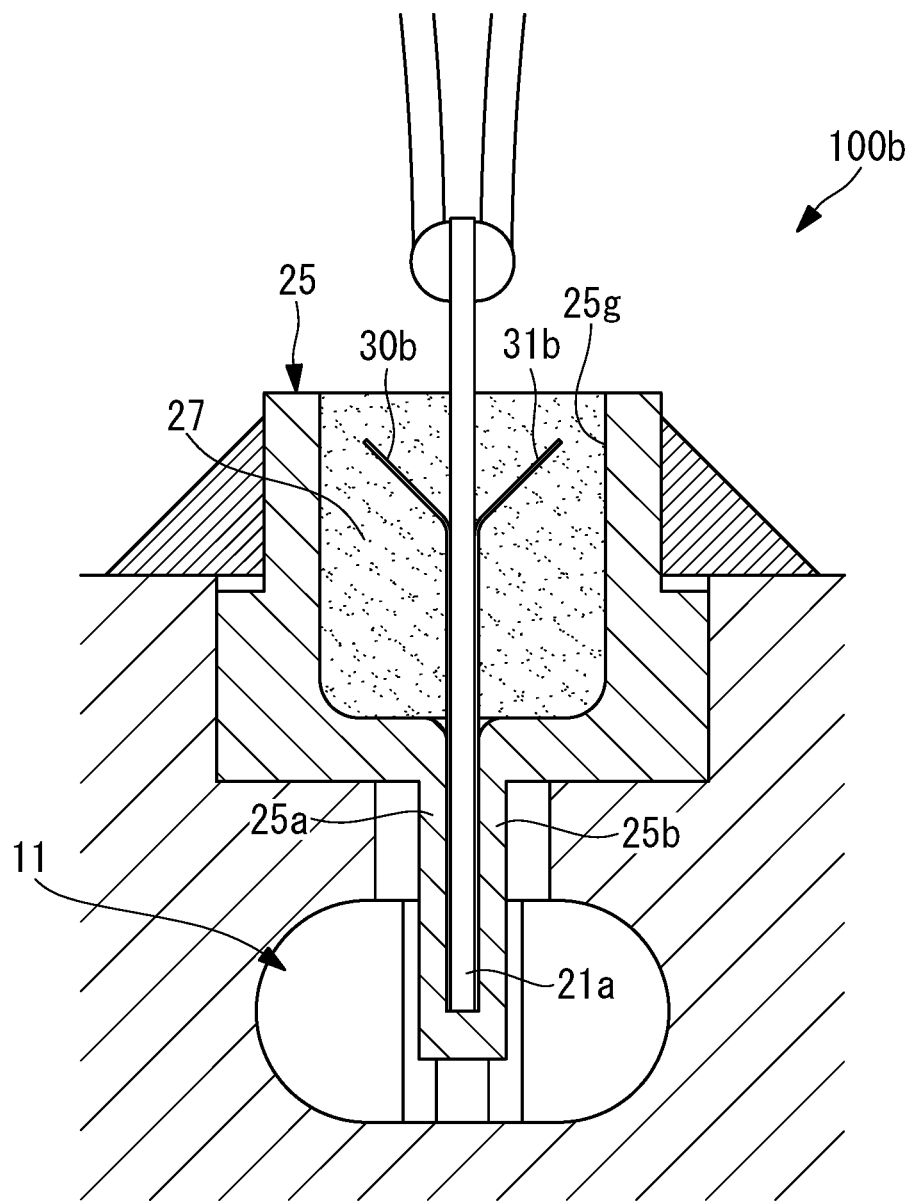
FIG. 13 is a longitudinal cross-sectional view showing a main portion of a Karman vortex flowmeter of a second embodiment.

As shown in FIG. 13, in the Karman vortex flowmeter 100b of the embodiment, the piezoelectric element 21a attached to the piezoelectric element holder 25 is formed to have the length long enough to project from the recess 25g of the piezoelectric element holder 25. In addition, thin film parts 30b and 31b of the embodiment is longer than the thin film parts 30 and 31 of the first embodiment, in a vertical direction shown in FIG. 13.

According to the embodiment, in gripping the piezoelectric element 21a and attaching it to the piezoelectric element holder 25, a worker or a working robot need not insert into the recess 25g fingers or a gripping part with which the piezoelectric element 21a is gripped. Therefore, attachment of the piezoelectric element 21a to the piezoelectric element holder 25 can be easily performed.

Figure 14:
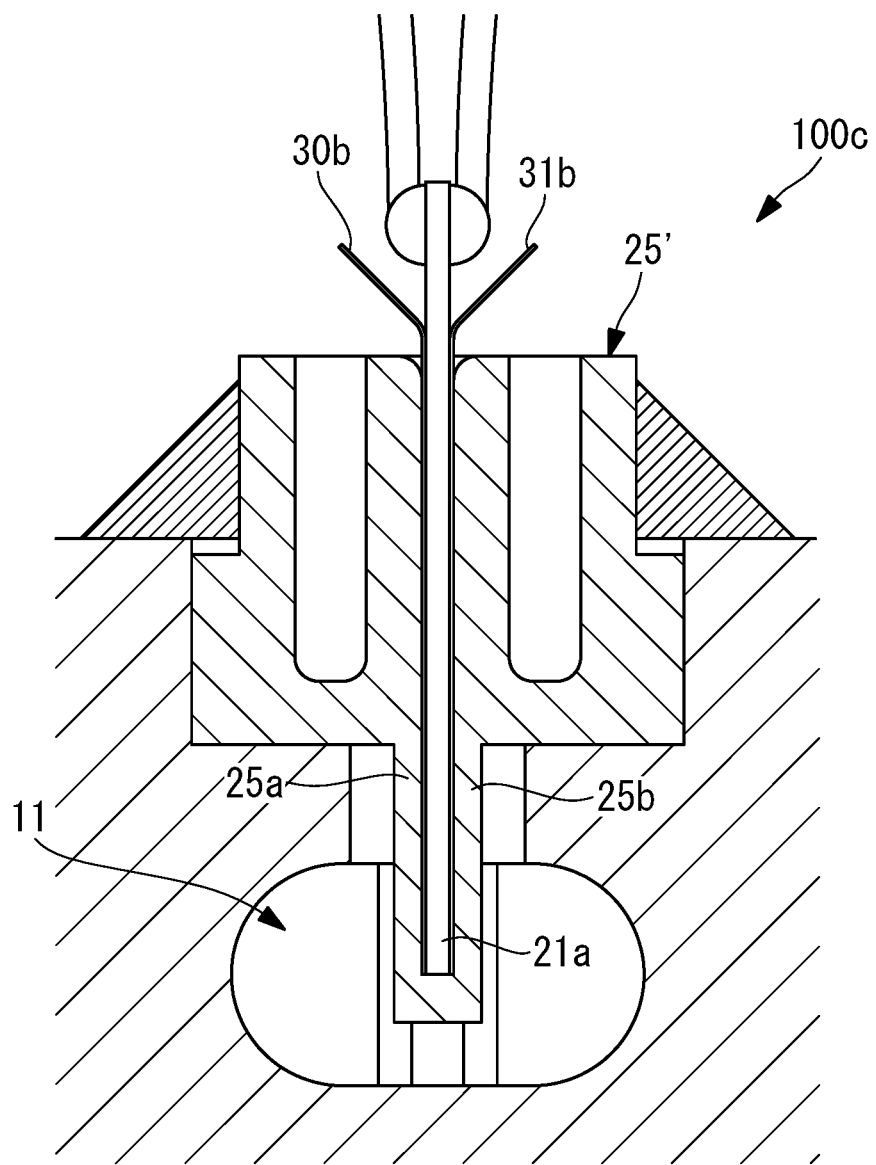
FIG. 14 is a longitudinal cross-sectional view showing a main portion of a Modified Example of a Karman vortex flowmeter.

The Karman vortex flowmeter 100b of the embodiment may be deformed to form a Karman vortex flowmeter 100c shown in a Modified Example of FIG. 14.

The Karman vortex flowmeter 100c shown in FIG. 14 includes a piezoelectric element holder 25' formed by deforming the piezoelectric element holder 25 shown in FIG. 13. In the piezoelectric element holder 25', the pair of plate-shaped parts 25a and 25b is formed so as to extend to an upper end of the piezoelectric element holder 25', and the piezoelectric element 21a is held in a region from a lower end to the upper end of the piezoelectric element holder 25'.

According to the Karman vortex flowmeter 100c of the Modified Example, the piezoelectric element 21a can be held more reliably while easy attachment of the piezoelectric element 21a to the piezoelectric element holder 25 is made possible.

{Other Embodiments}

The present invention is not limited to the above-mentioned embodiments, and can be appropriately changed without departing from the scope of the invention.

The invention claimed is:

1. A Karman vortex flowmeter comprising:
   a main body defining a flow passage configured for a flow of a fluid therethrough along a flow direction;
   a vortex generator positioned in the flow passage and thereby configured to generate Karman vortexes in a fluid flowing through the flow passage; and
   a flow rate measurement unit positioned on a downstream side of the vortex generator in the flow direction, and configured to measure the Karman vortexes generated by the vortex generator to thereby obtain a flow rate of the fluid, wherein the flow rate measurement unit includes:
      a piezoelectric element comprising a piezoelectric material formed in a plate shape, and further comprising a pair of electrodes joined to the piezoelectric material;
      a housing unit comprising a pair of plate-shaped parts and a bottom, the pair of plate-shaped parts and the bottom being integrally formed by a resin material; and
      a pair of thin film parts formed of a metal material with higher corrosion resistance to a corrosive fluid environment than the pair of electrodes;

the housing unit houses the piezoelectric element in a state where the piezoelectric element is sandwiched by the pair of plate-shaped parts integrally formed by a resin material;
   the housing unit is attached to the main body to position the piezoelectric element in the flow passage;
   the pair of thin film parts are positioned between the pair of plate-shaped parts and the pair of electrodes;
   the pair of the thin film parts comprises a first thin film part and a second film part and the pair of electrodes comprises a first electrode and a second electrode;
   the first thin film part is joined with the first electrode so as to cover an outside surface of the first electrode;
   the second thin film part is joined with the second electrode so as to cover an outside surface of the second electrode;
   a first outer peripheral surface of the piezoelectric element is adhered to an inner peripheral surface of one plate-shaped part of the pair of plate-shaped parts; and
   a second outer peripheral surface of the piezoelectric element is adhered to an inner peripheral surface of the other plate-shaped part of the pair of plate-shaped parts.

2. The Karman vortex flowmeter according to claim 1, wherein:
   the first electrode is joined to a first surface of the piezoelectric material, and the second electrode is joined to a second surface of the piezoelectric material; and
   the pair of thin film parts are arranged between the pair of plate-shaped parts and the pair of electrodes.

3. The Karman vortex flowmeter according to claim 2, wherein a thickness of each thin film part of the pair of thin film parts is not less than $\frac{1}{20}$ and not more than $\frac{1}{5}$ of a thickness of the piezoelectric element.

4. The Karman vortex flowmeter according to claim 3, wherein the thickness of the piezoelectric element is not less than 0.3 mm and not more than 0.4 mm, and the thickness of each thin film part of the pair of thin film parts is not less than 20 μm and not more than 60 μm.

5. The Karman vortex flowmeter according to claim 1, wherein a thickness of each thin film part of the pair of thin film parts is not less than $\frac{1}{20}$ and not more than $\frac{1}{5}$ of a thickness of the piezoelectric element.

6. The Karman vortex flowmeter according to claim 5, wherein the thickness of the piezoelectric element is not less than 0.3 mm and not more than 0.4 mm, and the thickness of each thin film part of the pair of thin film parts is not less than 20 μm and not more than 60 μm.

7. The Karman vortex flowmeter according to claim 1, wherein the pair of thin film parts are joined to the pair of electrodes by an adhesive.

8. The Karman vortex flowmeter according to claim 1, wherein the pair of thin film parts are formed at the pair of electrodes by vapor deposition.

9. The Karman vortex flowmeter according to claim 1, wherein:
   one electrode of the pair of the electrodes is joined so as to cover a length of a first surface of the piezoelectric material, and the other of the pair of the electrodes is joined so as to cover a length of a second surface of the piezoelectric material.

* * * * *